United States Patent Office 3,158,449
Patented Nov. 24, 1964

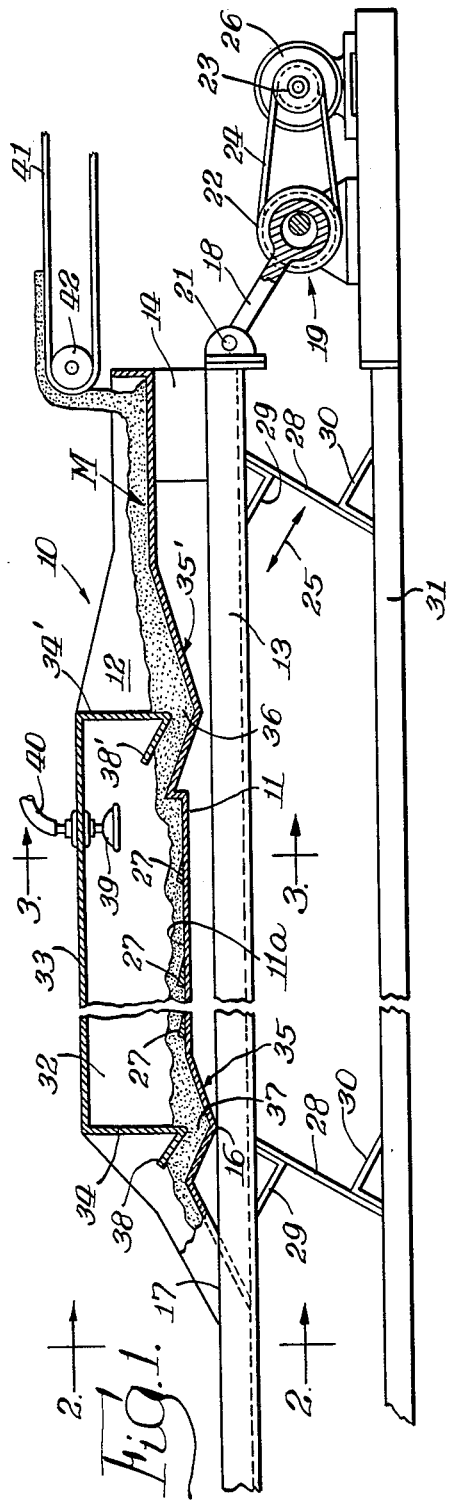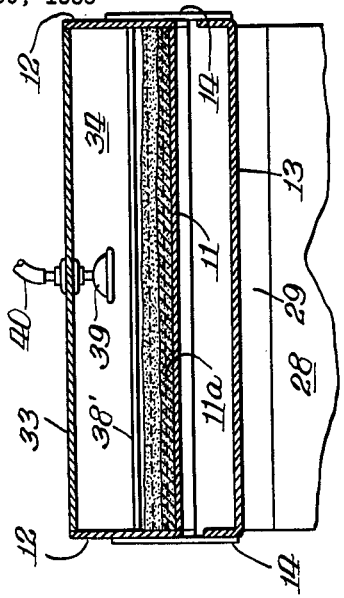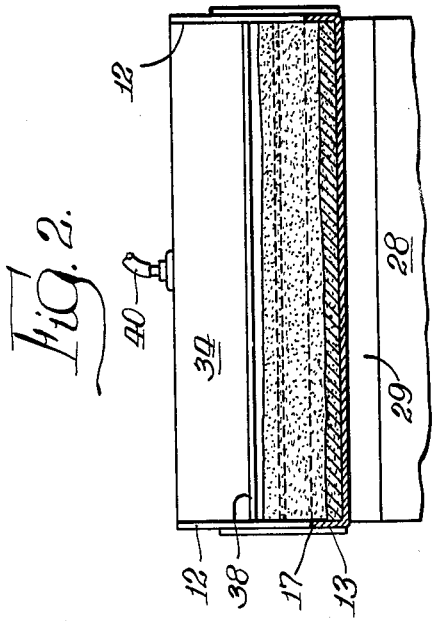
INVENTOR.
Robert Leon Opila

3,158,449
APPARATUS FOR TREATING FINELY DIVIDED MATERIAL WITH A GAS
Robert L. Opila, Westchester, Ill., assignor to Corn Products Company, New York, N.Y., a corporation of Delaware
Original application Sept. 30, 1959, Ser. No. 843,519, now Patent No. 3,114,656, dated Dec. 17, 1963. Divided and this application Sept. 14, 1962, Ser. No. 223,758
6 Claims. (Cl. 34—164)

This is a division of application Serial No. 843,519, filed September 30, 1959, now U.S. Patent 3,114,656.

This invention relates to a method and apparatus for treating finely divided material with a gas, and is particularly concerned with the continuous treatment of such materials with gases which, because of their corrosive or injurious nature, or for reasons of economy, should be confined to the treating zone and not permitted to escape into the surrounding atmosphere. More specifically, the invention is concerned with a novel method and apparatus for continuously modifying starch by treatment with hydrogen chloride gas.

The acidification of starch for subsequent use in dextrinization is a familiar procedure, and it is well known that the variability of the acid-inactivation power of starch is an important factor which must be considered if a uniform final product is desired. Suitable changes in acid concentration can of course be made to compensate for a change in acid-inactivation power of starch as soon as such change in acid-inactivation power is detected. In a continuous acidification process the detection of any change in acid-inactivation power of starch can be accomplished after the treatment of a much smaller volume of starch than is possible in a batch process of commercial proportions, because of the relatively small inventory of in-process starch required by the continuous process as compared to the batch process. This advantage of a continuous starch acidification process has been recognized in the art, but attempts in the past to develop a continuous process have been hampered by the difficulty inherent in effectively sealing the reaction chamber against the escape of corrosive acid fumes as the starch being treated is conveyed through the chamber. As a consequence, starch acidification processes commonly used in the industry have been batch processes which permit the reaction chamber to be tightly closed throughout the reaction period.

It is a broad object of the invention to provide an apparatus and method for continuously treating a finely divided material with a gas, wherein the material is conveyed through a confined zone containing the treating gas, and wherein packing glands or like sealing means are not required to prevent the escape of the gas from the treating zone.

A further object is to provide an apparatus for continuously treating a pulverulent material with a gas, which apparatus includes a chamber for containing the treating gas, and conveying means for conducting the material through the chamber, wherein the pulverulent material itself acts as the sealing means to prevent escape of the gas through the chamber openings.

An additional object is to provide an apparatus of the above description which is simple in design and operation, and which is relatively inexpensive to build when compared with prior art apparatus for the same purpose.

Other objects and advantages of the invention will in part appear from the following description thereof, and in part will be apparent to those skilled in the art to which the invention pertains.

In general, the apparatus of the invention comprises a trough-shaped vibratory conveyor which is covered over a portion of its length thus providing a tunnel portion or chamber for confining the treating gas. The tunnel portion or chamber has end walls depending from the top wall and terminating above the floor of the conveyor, forming openings providing ingress and egress to and from the chamber for the finely divided material transported by the conveyor. The conveyor is oscillated longitudinally and is preferably provided within the chamber with transverse ridges which are effective to agitate and mix the material passing through the chamber. The entrance and exit openings of the chamber are constructed in the form of traps which are filled by the pulverulent material flowing therethrough, whereby the material itself acts as a seal preventing escape of gas from the chamber.

Now, in order to acquaint those skilled in the art with the manner of constructing and operating one form of my invention, I will describe an embodiment thereof in connection with the accompanying drawing, which is somewhat diagrammatic in character, it being understood that the construction depicted therein is not intended to be limiting but merely illustrative of the invention defined in the appended claims. In the drawing:

FIGURE 1 is an elevational view, partly in section, of a preferred embodiment of the apparatus of the invention;

FIGURE 2 is a cross-sectional view taken on a line 2—2 of FIGURE 1; and

FIGURE 3 is a cross-sectional view taken on the line 3—3 of FIGURE 1.

Referring now to the drawing, my apparatus consists of a trough-like conveyor 10, preferably having a flat, somewhat horizontal bottom wall 11, having an upper reaction surface 11a, and being formed with substantially vertical flanges or sides 12 to provide lateral restraint and to retain the material to be treated on the conveyor. The conveyor 10 is fixed to a carrier or support member 13 by any conventional means, as by a bracket 14 at one end and by welding the conveyor to the carrier at other contiguous points, as at 16 and 17. The carrier is itself adapted to conduct material discharged from the conveyor 10 and, therefore, is conveniently fabricated in the form of a channel, as best shown in FIGURE 2. The bottom of the conveyor, during operation, is covered with a relatively thin layer of material M to be reacted, as will appear more fully hereinafter.

Oscillatory motion is imparted to the conveyor 10 by means of a drive unit consisting of a connecting rod 18 actuated by an eccentric 19 mounted in suitable bearings (not shown). The other end of the connecting rod is connected to the adjacent end of the carrier 13 by means of a pivot-bearing 21. The eccentric 19 is driven by a pulley 22 which in turn is driven by a pulley 23 by means of a belt 24. The pulley 23 is mounted on the shaft of an electric motor 26. Pulleys 22, 23 are preferably individually adjustable as to their working diameters so that the speed of rotation of the eccentric 19 may be varied within desired limits. Mixing elements 27, here shown as transverse protuberances of generally triangular cross-section, are mounted on or at the bottom wall 11 of the conveyor above or as a part of the reaction surface 11a to promote plowing up or mixing of the finely divided material undergoing treatment, in accordance with the invention.

The carrier 13 is supported preferably horizontally on any suitable parallel motion mounting means which, in the form illustrated, includes flexible reaction legs or struts 28 mounted rigidly at top and bottom by brackets 29, 30, positioning the struts at the required angle to give the desired motion to the conveyor when the struts 28 are flexed by the oscillatory drive mechanism. The brackets 29 are secured to the carrier 13, and the brackets 30 are secured to a foundation or base 31. With the construction just described, the direction of vibration imparted to the conveyor 10 is as indicated by the double arrow 25 in FIGURE 1.

When treating a finely divided solid material with a gas it is advantageous in most instances to bring about a mixing of the solids so that all of the particles are at least periodically in contact with the treating gas, and in the present invention this is achieved by the proper design of the mixing elements 27, by their arrangement along the bottom wall or floor of the conveyor, by the angularity of the support legs or struts 28, and by the amplitude and frequency of oscillation of the conveyor. For the treatment of starch with hydrogen chloride gas, when the starch bed is about ½" thick, the mixing elements 27 may be placed between about 3 and about 4 inches apart, as measured between corresponding points on adjacent mixing elements, and may have a height of about ³⁄₁₆", a width of the base, as viewed in cross-section in FIGURE 1, of about 1", an acclivity or entrance angle (facing upstream relative to the direction of flow of the starch) of about 15°, a declivity or downstream angle of about 35°, and an angle at the apex of about 130°. Operable values for the other factors are: angularity of struts 28 about 60° to the horizontal; frequency of oscillation of the eccentric, about 400–800 cycles per minute; amplitude of horizontal motion of conveyor between about ⅛" and about ½".

Operation of the apparatus, in accordance with the factors defined immediately above results in transportation of a finely divided material, such as starch, from right to left as viewed in FIGURE 1, during which the starch is levitated and continuously mixed, bringing the starch particles into the desired reaction contact with the hydrogen chloride gas. It is to be understood that the values of the various factors just discussed are merely illustrative, and not limiting, and that they may be varied as required for various pulverulent materials under different circumstances. For a further description of vibratory conveyors of the type just described, and the influences of the various factors on their operation, reference may be had to my copending application, Serial No. 762,464, filed jointly with Adolph Paul Oleson, on September 22, 1958, now U.S. Patent 3,086,008.

Referring again to the drawing, it will be seen that the conveyor is provided over a portion of its length with a chamber or tunnel 32 formed by a top wall 33, which is supported by the sides 12 of the conveyor trough, and by end walls 34, 34' depending from the top wall 33 and also extending completely across the conveyor trough. The top wall 33 and end walls 34, 34' are welded or otherwise sealed to the side walls 12 of the conveyor.

The conveyor floor 11 adjacent the ends of the chamber is formed with substantially V-shaped transverse depressions 35, 35' and the end walls 34, 34' of the chamber extend respectively downwardly into said depressions, terminating above the floor of the conveyor, thereby forming an inlet 36 and an outlet 37 to said chamber.

As noted above, the starch is levitated as well as translated on the conveyor and, therefore, a substantial amount of dust would result as the levitated starch came in contact with the vertical end walls 34, 34' since the end walls have a greater horizontal velocity than that of the levitated starch. To eliminate such dusting of the starch flowing from the openings 36 and 37, flanges 38 and 38' are provided extending angularly upwardly respectively from the bottom of said end walls 34, 34' in the direction of the material flow and substantially parallel to the corresponding inclined surfaces of the depressions 35, 35'.

The angles made by the walls of the depressions 35, 35' with the horizontal may be varied over a rather wide range with satisfactory results. For example, the acclivity angles of the depressions 35, 35'—i.e., the angles, relative to the horizontal, formed by the inclined surfaces forming the discharge sides of the respective depressions 35, 35'— may be between about 3° and about 25°, the angles near 25° being preferred since they permit the overall length of the apparatus to be correspondingly shortened. Acclivity angles of the depressions appreciably in excess of about 25° are not recommended since at such steeper angles the upper layers of the starch move at a higher rate than do the lower layers of starch under the influence of the vibration of the conveyor, resulting in non-uniform exposure of the starch to the treating gas. The highest points of the inclined surfaces forming the discharge sides of the depressions 35, 35' (i.e., the inclined surfaces downstream of the inlet 36 and outlet 37, respectively) are disposed slightly (e.g., ⅛") above the bottom edges of the respective end walls 34, 34'.

The declivity angles of the depressions 35, 35'—i.e., the angles, relative to the horizontal, formed by the inclined surfaces forming the upstream or input sides of the respective depressions—are also not closely critical. However, very small or very large declivity angles are not recommended for practical reasons since the small angles cause undue lengthening of the upstream portion of the conveyor, and the large angles promote dusting of the conveyed starch as it tumbles into the depressions. Moderate declivity angles, i.e., between about 10° and about 50°, are therefore preferred.

The dimensions of the end wall 34 are such that its bottom edge is no higher than, and preferably below, the upper surface 11a of the conveyor within the chamber 32; similarly, the bottom edge of the end wall 34' is positioned no higher than and preferably below, the horizontal stretch of the conveyor upstream from the opening 36. With this arrangement, the end walls 34, 34' and the depressions 35, 35' form traps which include the inlet opening 36 and outlet opening 37, respectively, and wherein the openings 36 and 37 are disposed entirely below the tops of the respective depressions 35, 35'.

A gas diffuser 39 for supplying anhydrous hydrogen chloride or other gas is provided in the chamber 32, preferably adjacent the inlet 36, and a flexible connection 40 connects the diffuser with the gas source (not shown). A feeding mechanism for the pulverulent material to be treated is provided at the input end of the conveyor, the feed mechanism being shown in the drawing as a belt 41 carried at its discharge end by a roller 42.

My apparatus and process will now be described as applied to the continuous acidification of starch. The eccentric 19 being adjusted to give an amplitude of horizontal motion of between ⅛" and ½", and the pulleys 22, 23 being adjusted to cause the eccentric to oscilalte at between about 400 and about 800 cycles per minute, the motor 26 is energized and the resulting oscillations are transmitted to the carrier 13, and thence to the conveyor 10. The starch to be treated is applied continuously and at a constant rate by a gravimetric feeding mechanism (not shown) to the belt 41 which delivers the starch to the input end of the conveyor 10. The starch is fed to the conveyor at a rate to produce a bed or stream of predetermined depth, e.g., one-half inch, across the width of the conveyor. Under the influence of the oscillatory motion of the conveyor, the starch distributes itself uniformly across the conveyor and moves as a bed through the gas treating tunnel or chamber 32 where it is contacted by anhydrous hydrogen chloride gas supplied through the gas diffuser 39. The hydrogen chloride gas is introduced into the treating chamber at a predetermined rate related to the volume of starch in the bed and to the desired degree of treatment intended for the starch.

Since the present apparatus is designed for continuous operation the inlet 36 and outlet 37 are preferably designed to have substantially the same cross-section as the cross-section of the bed of starch on the conveyor. As the starch flows longitudinally of the conveyor it fills the depressions 35, 35' in which the inlet 36 and outlet 37 are situated, thereby maintaining the inlet and outlet constantly totally submerged in the starch bed. As has been noted, the inlet 36 and outlet 37 are disposed entirely below the tops of the depressions 35, 35' located adjacent the respective end walls 34, 34', so that the stream of starch first flows downwardly to the inlet 36, then upwardly from the inlet into the reaction zone in the chamber 32. After traversing most of the reaction zone, the starch stream flows downwardly to the outlet 37, then upwardly from the outlet exteriorly of the chamber 32. By following the vertically reversing paths required by this construction, the starch continuously fills the inlet 36 and outlet 37, and thus the starch itself acts as the means for sealing the reaction chamber to prevent the escape of hydrogen chloride gas. Moreover, with the construction just described it will be appreciated that the openings 36 and 37 will remain submerged in the starch being treated even though the starch is fed to the conveyor at a rate which is not constant, and even if the starch input to the conveyor is interrupted altogether. Under the influence of the mixing elements 27 the starch passing through the chamber is thoroughly plowed or mixed, thereby vastly increasing the exposure of the starch particles to the hydrogen chloride gas for reaction therewith.

It will, of course, be understood that an important feature of my invention, i.e., the provision of vertically reversing paths for the particulate material providing sealing traps at the ends of the reaction zone, may be practiced whether or not any means is provided for mixing the solid particles in the reaction zone. It will also be obvious that those skilled in the art may make various changes in the details and arrangement of parts in my apparatus without departing from the spirit and scope of the invention as defined in the appended claims, and it is therefore not intended that the invention should be restricted to the precise construction herein disclosed.

I claim:

1. In an apparatus for treating finely divided material including a vibratory conveyor for transporting said material, and a tunnel member fixed to and covering a portion of the length of said conveyor, the improvement which comprises forming a transverse substantially V-shaped depression in the surface of said conveyor at each end of said tunnel and providing end walls for said tunnel extending downwardly from the top thereof into said respective depressions to a level below the top of said depressions but above the floor of said conveyor, thereby forming traps through which said material must pass when entering and leaving said tunnel.

2. Apparatus for contacting finely divided material with a gas which comprises a vibratory conveyor, a tunnel member covering a portion of the length of said conveyor, the sides of said tunnel sealingly engaging said conveyor, said tunnel having end walls extending downwardly from the top thereof to a level above the floor of said conveyor to provide respectively an inlet and an outlet to said tunnel, said end walls of the tunnel cooperating with the floor of said conveyor to define vertically reversing paths including respectively said inlet and outlet for passage of said material, and means for introducing a gas into said tunnel.

3. Apparatus for treating finely divided material which comprises a vibratory conveyor, a tunnel member covering a portion of the length of said conveyor, the sides of said tunnel sealingly engaging said conveyor, said conveyor having a transverse substantially V-shaped depression adjacent each end of said tunnel, said tunnel having end walls extending downwardly from the top thereof into said respective depressions to a level below the tops of said depressions but above the floor of said conveyor, whereby said end walls of the tunnel and the floor of said conveyor cooperate to define traps including respectively inlet and outlet openings to said tunnel disposed entirely below the tops of said depressions.

4. Apparatus for treating finely divided material which comprises a trough-shaped vibratory conveyor, a chamber formed integrally with said conveyor and including a top wall disposed over a portion of the length of said conveyor and secured at its sides to the walls of said trough, and end walls depending respectively from the ends of said top wall and extending downwardly to a level above the floor of said conveyor to provide respectively an inlet and an outlet to said chamber, said end walls of said chamber cooperating with the floor of said conveyor to define vertically reversing paths including respectively said inlet and said outlet for passage of said material through said chamber.

5. Apparatus for treating finely divided material which comprises a trough-shaped vibratory conveyor, a chamber formed integrally with said conveyor and including a top wall disposed over a portion of the length of said conveyor and secured at its sides to the walls of said trough, and end walls depending respectively from the ends of said top wall, said conveyor having a transverse substantially V-shaped depression in the floor thereof adjacent each of said end walls of said chamber, said end walls extending downwardly respectively into said depressions to a level below the tops of said depressions but above the floor of said conveyor, whereby said end walls of said chamber and the floor of said conveyor cooperate to define traps including respectively inlet and outlet openings to said chamber disposed entirely below the tops of said depressions.

6. Apparatus in accordance with claim 5 wherein said conveyor floor within said chamber is provided with longitudinally spaced transverse ridges, and including means for oscillating said trough longitudinally and parallel motion mounting means for supporting said trough.

References Cited in the file of this patent

UNITED STATES PATENTS

| | | |
|---|---|---|
| 1,941,561 | Lee | Jan. 2, 1934 |
| 2,508,884 | Heseng | May 23, 1950 |
| 3,058,235 | Morris et al. | Oct. 16, 1962 |
| 3,089,253 | Evans | May 14, 1963 |
| 3,089,653 | Ostberg | May 14, 1963 |
| 3,090,134 | Morrison | May 21, 1963 |